United States Patent [19]

Vinsant et al.

[11] Patent Number: 5,475,296
[45] Date of Patent: Dec. 12, 1995

[54] DIGITALLY CONTROLLED SWITCHMODE POWER SUPPLY

[75] Inventors: Ronald G. Vinsant, Mountain View; John E. DeFiore, Sunnyvale, both of Calif.

[73] Assignee: Adept Power Systems, Inc., Mountain View, Calif.

[21] Appl. No.: 227,956

[22] Filed: Apr. 15, 1994

[51] Int. Cl.$^6$ .................................................. G05F 1/575
[52] U.S. Cl. .......................... 323/223; 323/283; 323/284
[58] Field of Search ..................................... 323/223, 232, 323/237, 241, 247, 254, 265, 282, 283, 292

[56] References Cited

U.S. PATENT DOCUMENTS

| | | | |
|---|---|---|---|
| 4,356,542 | 9/1982 | Bruckner et al. | 363/26 |
| 4,835,454 | 5/1989 | White | 823/222 |
| 5,079,498 | 1/1992 | Cleasby et al. | 323/283 |

Primary Examiner—Peter S. Wong
Assistant Examiner—Aditya Krishman
Attorney, Agent, or Firm—Flehr, Hohbach, Test, Albritton & Herbert

[57] ABSTRACT

A digitally controlled switchmode power supply by the use of a pulse width modulated (PWM) controlled field effect transistor, switches an inductor between input and output sides to provide a controllable DC output voltage. The digital processor receives and digitizes the input and output voltages and also the current through the associated inductor and derives a PWM control loop signal driving the associated field effect switching device to switch the inductor. The foregoing compensates for nonlinear changes in the value of the inductance due to changes in inductor currents and also avoids resonance at pole points of the LC circuit in the power supply. In addition a change in buck to boost modes may be accomplished automatically depending on input voltage operating conditions.

7 Claims, 6 Drawing Sheets

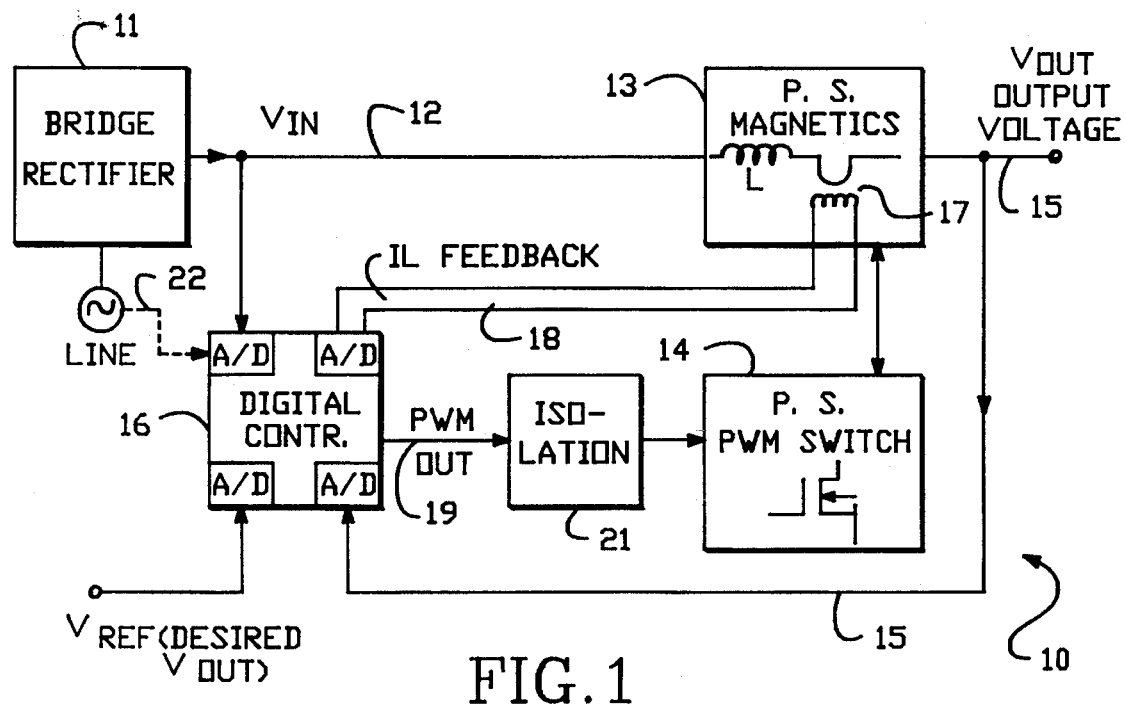
FIG.1
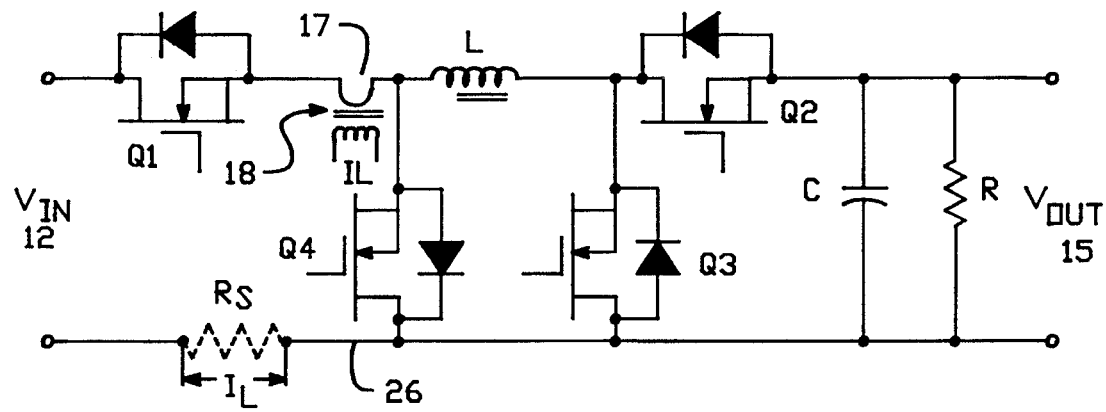
FIG.2
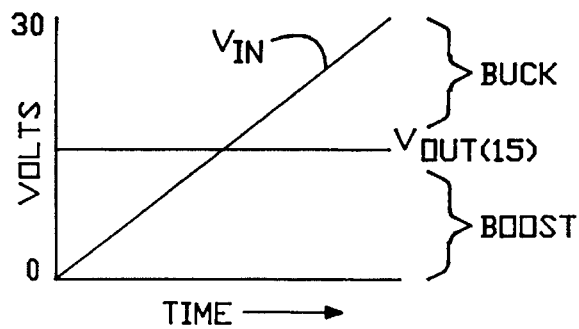
FIG.3
FIG.4

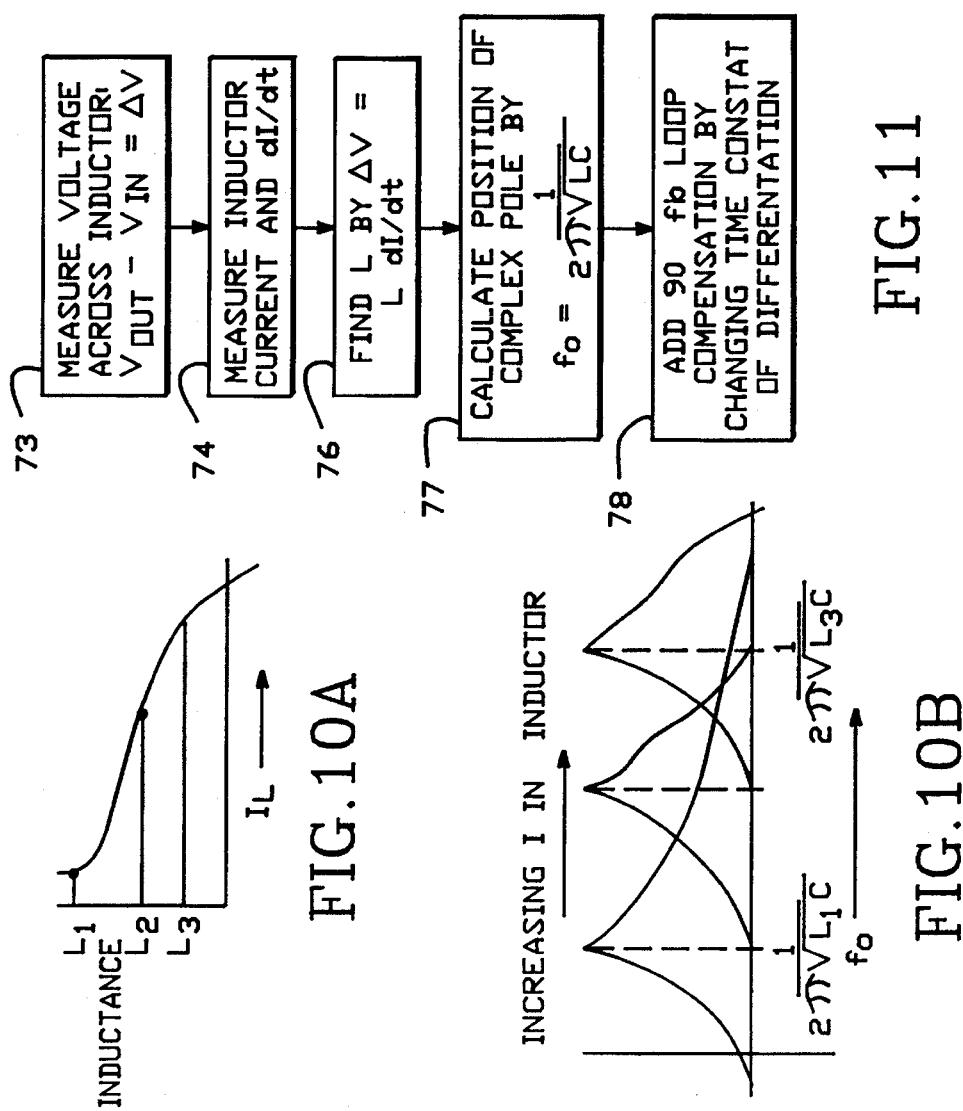

DIGITALLY CONTROLLED SWITCHMODE POWER SUPPLY

The present invention is directed to a digitally controlled switchmode power supply and more specifically to a power supply for converting a DC input voltage to a DC output voltage for driving sophisticated electronic systems.

BACKGROUND OF THE INVENTION

Power conversion for the majority of electronic equipment utilizes power supplies that convert power from one form to another. Typically the AC line power of 120 volts is full wave rectified to DC and then this DC voltage (which may be variable or unstable) is controlled by an analog type power supply to, for example, provide a DC voltage of 12 volts. Where the power supply must provide invariable DC voltage or a closely regulated output voltage, analog feedback is used which compares the output voltage of the power supply to a reference. And typically the error voltage may drive a switch with a pulse width modulated (PWM) signal. A very common type of analog power supply of this type is a switchmode supply where an inductor is switched between input and output sides of the power supply to provide well known modes of operation such as buck, boost, inverting, flyback, etc.

Such power supplies suffer several drawbacks such as the variation of parameters in analog components, a difficulty in adjusting to different operating conditions, changing operating conditions, and in general, a relative operational inflexibility especially when applied to a host electronic system which has complex demands.

OBJECT AND SUMMARY OF THE INVENTION

It is therefore a general object of the present invention to provide a digitally controlled power supply.

In accordance with such object, there is provided a digitally controlled switchmode power supply having an inductor for converting a DC input to a DC output voltage comprising switching means connected to the inductor for switching the inductor between the input and the output voltages, the switching means having a control input. Digital processor means to receive and digitize the input and output voltages, $V_{in}$ and $V_{out}$, a desired output voltage, $V_{ref}$, and current through the inductor, and derives a control loop signal from the voltages and current for driving the control input so that the output voltage is substantially equal or proportional to $V_{ref}$.

BRIEF DESCRIPTION OF THE DRAWINGS

FIG. 1 is a generalized block diagram embodying the present invention.

FIG. 2 is a more specific circuit schematic showing portion of FIG. 1.

FIG. 3 is a characteristic curve illustrating the operation of FIG. 2.

FIG. 4 is a table illustrating the operation of FIG. 2.

FIGS. 10A and 10B are characteristic curves illustrating the effect of nonlinearity of the inductor of the present invention.

FIG. 11 is a flow chart for the compensation of such nonlinearity of inductance.

FIG. 12 is a graph of an operational parameter of the invention compensation for inductance.

DETAILED DESCRIPTION OF PREFERRED EMBODIMENTS

Figure 5:
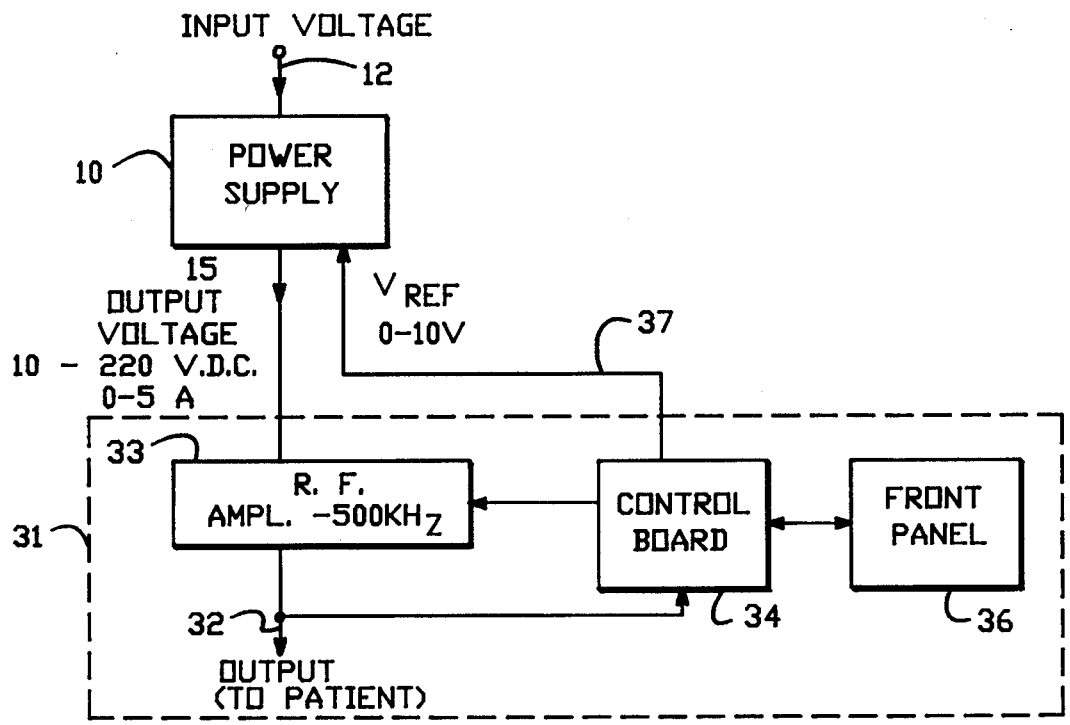
FIG. 5 is a block diagram of a typical application of the power supply of the present invention.

FIG. 1 illustrates the simplified form of the power supply 10 of the present invention which is connected to line voltage which is then full wave rectified by the bridge rectifier 11 to provide on the line 12 a DC input voltage, $V_{in}$. Power supplies of the switchmode type and as will be discussed later may be switchable between buck and boost modes among others. Such switchmode power supply includes the switchable inductor L located in power supply (P.S.) magnetics unit 13 which is driven by the pulse width modulated switching unit 14 (in this embodiment a field effect transistor) to switch L between the input and output voltage sides of the power supply; this provides the well known buck or boost switchmode operation. The output voltage $V_{out}$ is on line 15.

The overall operation of the power supply is controlled by a digital processor 16 which is designated as a digital controller and may be, for example, a controller of Model HPC46100, manufactured by National Semiconductor Corporation. Such controller includes digital signal processing means (DSP) to convert various analog inputs to digital. Thus the controller 16 shows four A/D conversion units although in actual practice this is handled by a single A/D unit with multiplexing. Thus the various analog inputs which are digitized are from line 12 the input voltage, $V_{in}$, line 15 the output voltage, $V_{out}$, $V_{ref}$ which is the desired output voltage which will be used as the reference control input in the control loop to be discussed; and finally there is a feedback of inductive current from the inductor L via a current transformer 17 on line 18 designated by $I_L$ feedback. All of these are digitized and from these signals is derived a control loop signal which appears on line 19 as PWM out which after isolation 21 drives the switch 14 to provide an output voltage substantially equal or proportional to $V_{ref}$.

Line voltage as shown by the dashed line 22, also may be fed back from the line voltage supply to digital controller 16. Both that voltage and $V_{in}$ are, of course, feed forward voltages. This enables the system to react rapidly to unwanted changes in input.

Thus in summary from a control standpoint, there is feedback of both the output voltage and inductive current. There is feed forward of the input voltage (and sometimes line voltage) and these are compared to the $V_{ref}$. The resultant control loop signal of the PWM type on line 19 drives switch 14 so that the output voltage is substantially equal or proportional to the $V_{ref}$.

FIG. 2 shows a more detailed actual circuit of both the power supply magnetic and the PWM switching units 13 and 14 of FIG. 1. As in unit 13, inductor L is illustrated along with the current transformer 17 to provide the current feedback on line 18. Alternatively such feedback could be provided on the return line 26 by the resistor $R_s$ as indicated. Switches Q1, Q2, Q3, and Q4 represent the PWM switch of unit 14 of FIG. 1.

FIG. 2 illustrates topology for either a buck or boost switchmode converter, depending on the configuration of the three field effect transistor switches Q1, Q2 and Q3. These are indicated as both switches and, as is typical of field effect transistors of this type, as having a permanent effective diode. The circuit also includes a parallel connected capacitor C and resistor R on the output side 15.

FIG. 3 illustrates the operation of this power supply in both buck and boost modes. In the buck mode, the input voltage $V_{in}$ is greater than the output voltage. Thus, for example, if $V_{in}$ was 30 volts DC and the desired output voltage is 15 volts, the voltage would have to be "bucked" or brought down to 15. Inversely, in a boost mode where the input voltage is less than the output voltage, it, of course, must be boosted up, as is clear from FIG. 3.

To accomplish the foregoing, the four field effect transistor switches Q1, Q2 and Q3, Q4 are switched in accordance with the table of FIG. 4. Thus, for example, for the buck mode, Q1 has the PWM signal on line 19 applied to it, Q4 the inverse or reciprocal signal, Q3 is OFF and Q2 remains permanently ON. And then for boost, Q1 is ON permanently, Q2 has a reciprocal PWM signal, Q4 is OFF and Q3 is the normal PWM switch 14 which in accordance with well known switchmodes power supply switching principles determines, with regard to the duty cycle of the PWM signal, the output voltage.

FIG. 5 illustrates the operation of the power supply 10 of the present invention in actual use with a host or associated system 31. Such a system as illustrated is in the medical field and the electrical output illustrated in 32 drives a cutter which goes through human skin and blood vessels of a patient being operated upon. The cutter is driven by an R.F. amplifier 33 controlled by a control board 34. The unit includes a front panel 36. The effective resistance of the patient's skin or flesh is sensed by the control board 34 which provides a reference voltage 37 which is fed back to power supply 10. This is proportional to the desired output voltage of the power supply. Such output voltage appears on line 15 and, for example, varies from 10 to 220 volts DC and then drives the power amplifier 33. In this embodiment the load may change in milliseconds if, for example, the cutter goes through a blood vessel where conductive salt is present. In this case the power supply must immediately respond to the change in reference voltage on line 37 to decrease its output voltage. Thus, frequency response is of great importance and its implementation in the present invention will be discussed in detail below.

Referring again to the buck and boost mode of operation discussed in conjunction with FIGS. 2, 3, and 4, FIGS. 6A and 6B illustrate respectively the buck and boost modes with $V_{out}/V_{in}$ versus duty factor. In the buck mode of FIG. 6A, the input voltage is always greater than the output voltage and in the boost mode of FIG. 6B it is the opposite. Thus the two characteristics that are the opposite of one another or quite different and the feedback loop must accommodate this.

Figure 7A:
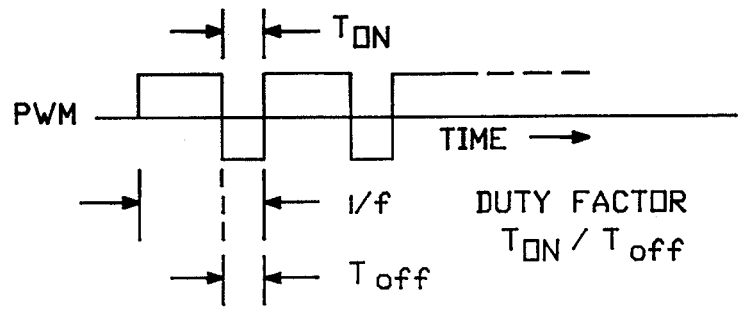
FIG. 7A is a waveform diagram illustrating the pulse width modulated signal of the present invention.
Figure 7B:
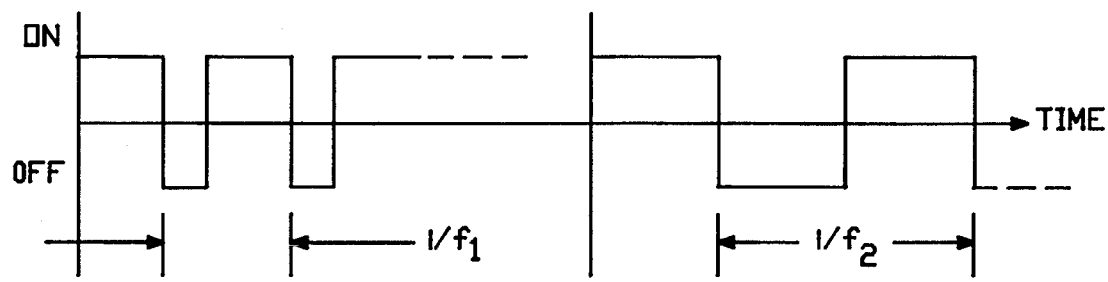
FIG. 7B is a waveform diagram illustrating an alternate to PWM.

Briefly referring to FIG. 7A, of course, a typical pulse width modulated waveform is shown where the duty factor is $T_{on}$ divided by $T_{off}$ as indicated. And it is the duty factor which is the control element in governing the level of the output voltage of the power supply of the present invention; a typical switchmode power supply of the buck or boost type. The PWM frequency is indicated as a reciprocal of the cycle time. A change of frequency will not change the output voltage, per se, and thus is not a direct control parameter. FIG. 7B illustrates an equivalent alternative to PWM where the control signal is a variable frequency which controls the duty factor or cycle. Here the ON time or the OFF time is constant (but may be different from each other).

Figures 6A, 6B:
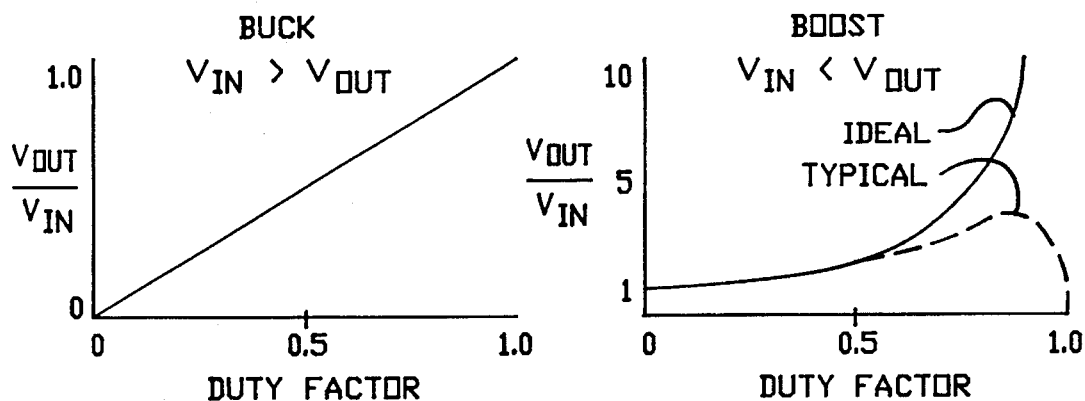
FIGS. 6A and 6B are characteristic curves of different modes of operation of the power supply.
Figure 8:
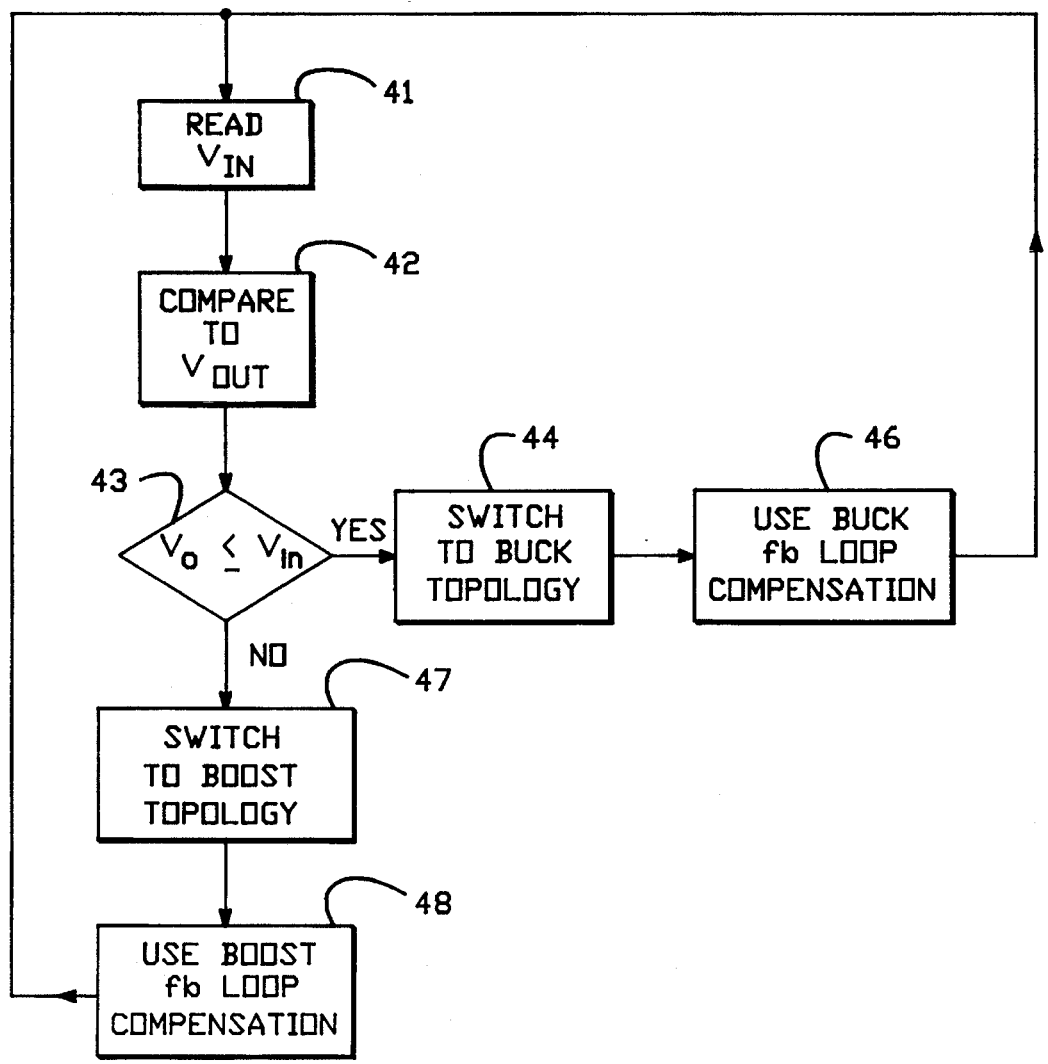
FIG. 8 is a flow chart illustrating implementation of the two above modes of operation.

FIG. 8 illustrates the control scheme that the digital controller has stored in it to implement the buck/boost change. In step 41 the input voltage is read and compared in step 42 to the output voltage. In step 43 if the output is less a buck topology is necessary and in step 44 and 46 this is implemented and the buck loop compensation in accordance with FIG. 6A is utilized. Conversely, in steps 47 and 48 the opposite situation occurs where boost topology is used and a loop compensation according to FIG. 6B.

Figure 9:
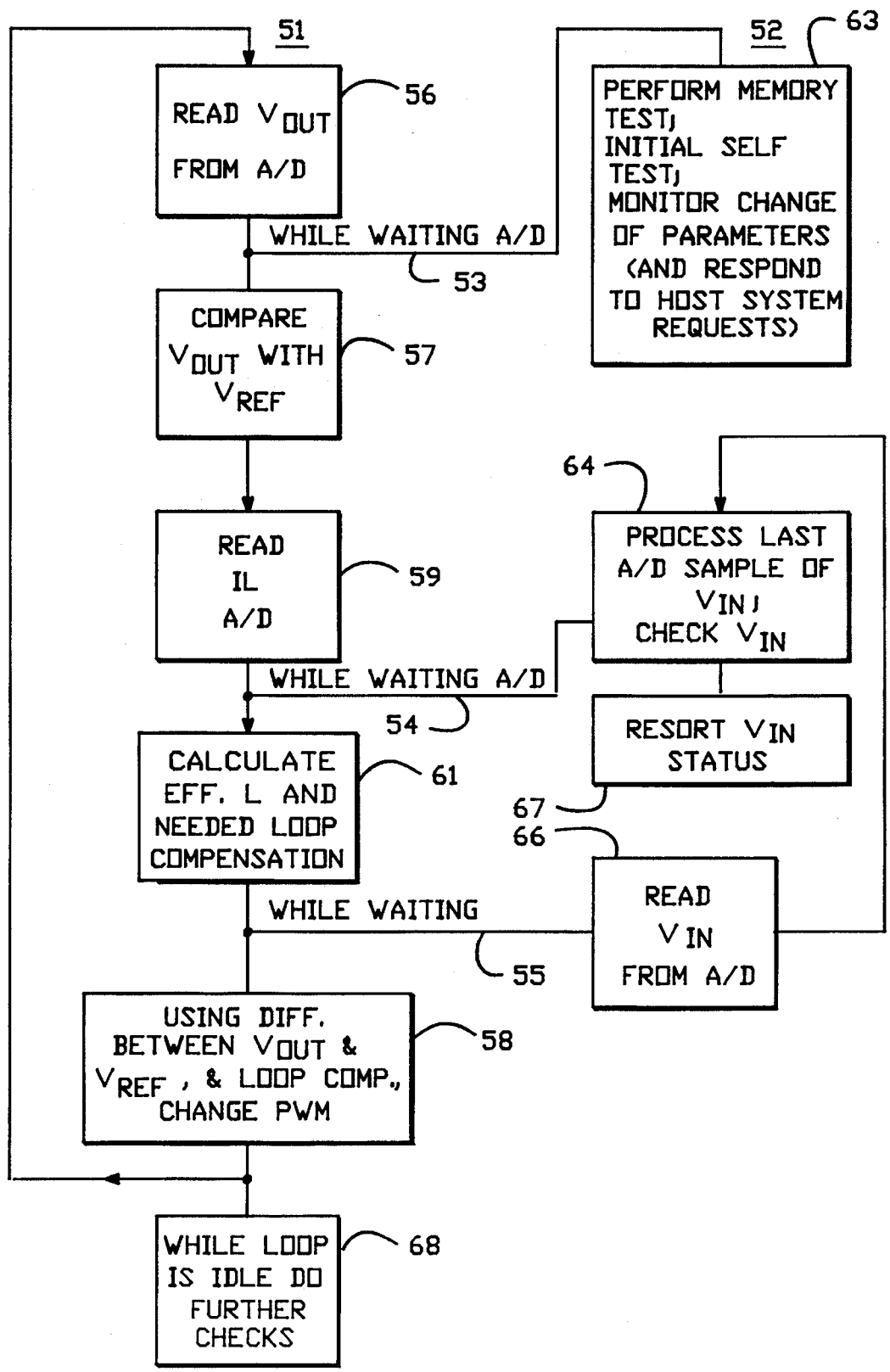
FIG. 9 is a generalized flow chart of the operation of the present invention.

FIG. 9 illustrates the generalized operation of the power supply 10 and also illustrates its multitasking ability. Two control loop columns or paths are indicated with the left column 51, the main control loop which directly implements the feedback and feed forward necessary to control the output voltage to the desired $V_{ref}$. In the right hand column 52 are various auxiliary functions. These are performed, as indicated by the lines 53, 54, 55, generally while analog digital conversion is taking place or other calculations are being made.

Now with respect to the main flow chart column 51, in step 56, $V_{out}$ is read out in digital form and in step 57 compared with the reference to thus provide an error voltage. However, jumping to step 58, this error voltage is now used to change duty factor of PWM signal incrementally to achieve the necessary control correction until as illustrated in blocks 59 and 61, the inductor current is read and digitized and an effective "L" is calculated to provide for needed loop compensation. Then as illustrated in step 58, this compensation is utilized along with the error signal between $V_{out}$ and $V_{ref}$ to change the PWM signal to the proper duty cycle. Finally in loop 62 the process is repeated.

Multitasking occurs while waiting for A to D conversion or other calculations such as calculation of effective inductance in step 61. Thus in step 63 while awaiting for the A to D conversion of the output voltage, internal memory checks can be made which are of crucial importance for safety, especially in the medical field. This involves checking each memory location to make sure that the memory is intact and functioning properly because a memory failure could lead to an over voltage on the output which would be a patient safety issue. Another check is a self test for third wire leakage currents. For example, in the medical field if a patient is not grounded properly this might result in some harm. Finally the unit, because of its digital processing capability, can monitor a change in parameters and respond to a host system request. For example, referring to the host or associated system shown in FIG. 5, through line 37 of the control board 34, if some parameter or condition became critical, a request could be made of the power supply unit to monitor and report on any changes. Thus, interactivity for monitoring unusual operating conditions takes place between the power supply and the associated host system.

Next step 64 shows another multitasking procedure which takes place while waiting for the A to D conversion of the inductive current. Here, referring to step 66 also, incoming line voltage is monitored and converted and then processed in step 64 and checked. And the status can be reported in step 67. Step 68 illustrates other checks that can be made while the loop is returning to its beginning.

Thus in the present invention all of these tests, such as initial self test, monitoring change of system parameters, processing and changing input voltage, are made by the same processor that is used for the overall control function. In the past analog power supply systems have had checking capabilities but with a separate error checking system and external circuitry was necessary.

In general, other checks which are necessary might include a ripple current check which indicates whether an output capacitor in the power supply has degraded and is close to failure; then the initial self test which makes sure all the operating parameters are properly functioning. Also in fields other than medical such as telecommunications and transportation where a power supply is necessary, usually the first defect in the system is noticed in the power supply; so a safety check here immediately indicates that the system is close to a failure mode.

The inductor L in the power supply of the present type is inherently nonlinear as shown by FIG. 10A; that is, with increasing current, the inductance will change in a nonlinear fashion. One possible reason for the change is a step gap in the inductor "iron"; and then at light loads the characteristics of the inductor are different than at heavier loads. Such a nonlinearity causes the complex poles to move as illustrated in FIG. 10B where the capacitor portion of the power supply forms an L filter which has resonance points as determined by classical electrical formula for resonance as illustrated in FIG. 10B. Thus three resonance points are illustrated.

Of course, if a resonance point were not to be compensated, this would ruin or prevent effective feedback. This is because in a feedback loop a proper negative control feedback is 180°; a resonance pole converts such a negative feedback to an unstable positive feedback. What was done in the past as illustrated in FIG. 12, in an analog circuit was at the first resonance point, which was computed for worse case conditions, a 90° phase lead shifting circuit was inserted; this would bring the feedback to 270° for stable operations. However, at higher currents, the frequency response would remain flat as indicated by line 71. Thus the analog circuit uses a fixed phase lead.

However in accordance with the present invention as shown by the dashed line 72 with a continuous software loop compensation where a phase lead is always added in accordance with the need as will be discussed below, the frequency response will increase as demanded. Thus in summary, faster performance at higher current conditions is not sacrificed.

The flow chart of FIG. 11 illustrates the technique implemented by the digital controller unit for providing the proper loop compensation which effectively adds a phase lead to prevent operation at one of the pole resonance points. In step 73 the voltage difference $\Delta V$ across the inductor effectively is just the difference between the output and input voltage. And in step 74 the inductor current $I_L$ is instantaneously measured over a time period to prove a dI/dT. In step 76, the well known relationship that the voltage across the inductor is the product of the inductance and the change of current is utilized in finding the actual inductance. And then in step 77, by using the actual inductance which is the online inductance of the circuit as it is currently operating, the complex pole position frequency is found. Then loop compensation in step 78 is provided effectively by software processing techniques which change the time constant of differentiation in the feedback loop to provide the proper PWM signal. This time constant then avoids the resonance associated with that particular calculated pole in step 77. The foregoing is easily implemented.

Figure 13:
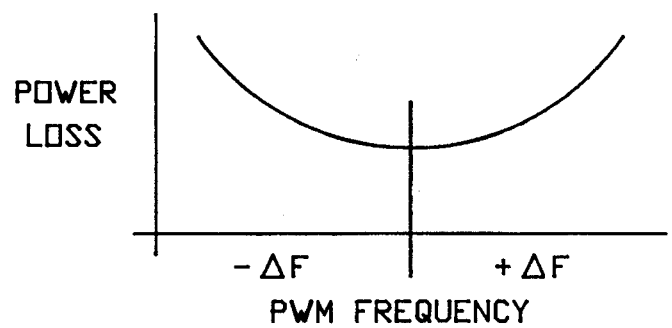
FIG. 13 is a characteristic curve showing an operational feature of the present invention.

One other feature of the invention made possible by the use of a digital controller is the operation at a PWM frequency which provides for maximum efficiency or minimum power loss. FIG. 13 illustrated PWM frequency versus power loss and a minimum point may be hunted for by testing positive and negative delta frequencies as indicated. As discussed above, of course, change in frequency does not affect the overall PWM control function of the feedback loop. As implemented by the flow charts of FIGS. 14A and 14B, in the step 81 the efficiency (or power loss) at various frequencies is calculated as will be discussed in conjunction with FIG. 14B. Then in steps 82 and 83, the frequency is incremented or decremented and it is noted whether the efficiency is improved in steps 84 and 86 by checking power change in step 87 depending on what the maximum efficiency point is, the PWM frequency is changed.

Figure 14A:
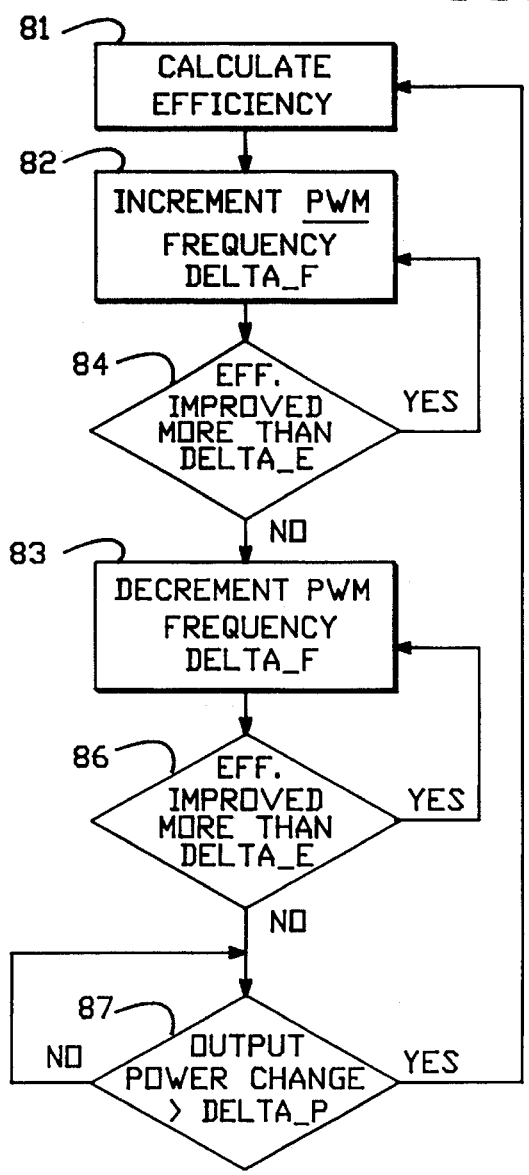
FIGS. 14A and 14B are flow charts illustrating the implementation of FIG. 13.
Figure 14B:
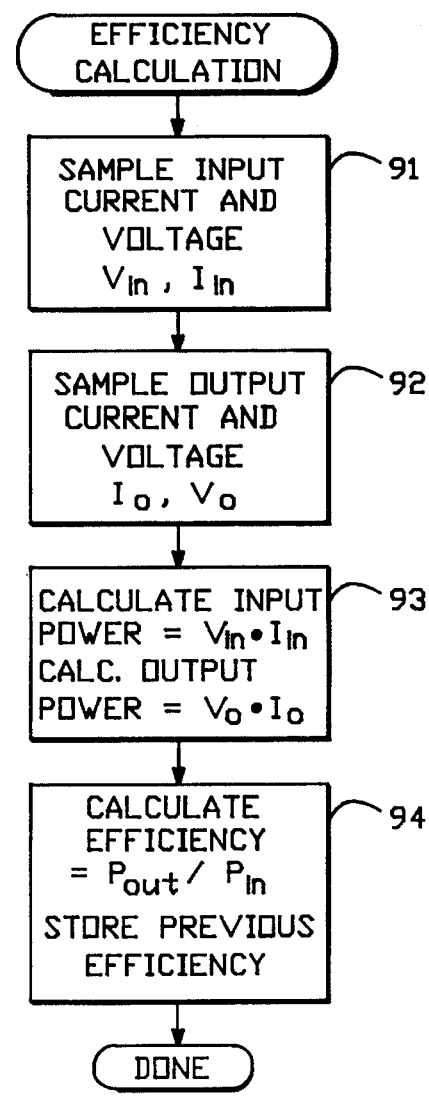

The flow chart of FIG. 14B is the efficiency calculation of step 81 in FIG. 14A. Thus in step 91 the input voltage and current is sampled and in step 92 the output voltage and current. Efficiency is then calculated by finding the input and output powers in step 93 and taking a ratio in step 94. This, of course, is done over a range of various PWM frequencies so that the point of most efficient operation may be established.

Thus the present invention has provided a digitally controlled switchmode power supply which offers significant advances in functionality, accuracy of operation, and speed of response over prior analog systems.

What is claimed is:

1. A digitally controlled switchmode power supply having an inductor where the inductance of said inductor varies with inductor current for converting a DC input to a DC output voltage comprising:

switching means connected to said inductor for switching said inductor between said input and said output voltages, said switching means having a control input;

digital processor means for receiving and digitizing said input and output voltages, $V_{in}$ and $V_{out}$, a reference output voltage, $V_{ref}$, and current through said inductor, and for deriving a control loop signal from all of said voltages and from said current for driving said control input so that said output voltage is substantially equal or proportional to $V_{ref}$;

means for sensing substantially instantaneous changes in said inductor current whereby the dI/dT of said inductor can be measured by said digital processor means and then determining the value of inductance, L, by $$\Delta V = V_{out} - V_{in} = L di/dt$$

where $\Delta V$ is the voltage across said inductor, and determining a complex pole of resonance by $$f_o = 1/2\pi\sqrt{LC}$$

where $f_o$ is a resonant frequency and C a constant capacitor in said power supply;

and means for providing a phase lead in said control signal by changing a time constant of differentiation in accordance with said pole to avoid said resonance.

2. A digitally controlled power supply as in claim 1 where said control signal is pulse width modulated (PWM), the duty cycle of said PWM signal determining said output voltage.

3. A digitally controlled power supply as in claim 1 where said digital processor means includes analog to digital converter means for processing said $V_{out}$ and inductor current said microprocessor means simultaneously performing at least one of the following functions while said digital converter means is processing;

1) initial self test of power supply and associated system being driven 2) monitor change of system parameters 3 process and check input voltage.

4. A digitally controlled power supply as in claim 1 where an associated system is being driven by said power supply and where said digital processor means responds to request from said associated system for monitoring a change in operating conditions of said associated system.

5. A digitally controlled power supply as in claim 1 where said control signal has a variable duty cycle which determines said output voltage, said duty cycle being varied by a change in signal frequency with a constant ON or OFF time.

6. A digitally controlled power supply as in claim 2 including means for incrementally changing the frequency of said PWM signal to provide maximum efficiency including the steps of incrementing and decrementing such frequency, determining efficiency by measuring the ratio of power out and power in, and changing said frequency to provide said maximum efficiency.

7. A digitally controlled power supply having an inductor for converting a DC input to a DC output voltage comprising:

switching means connected to said inductor for switching said inductor between said input and said output voltages, said switching means having a control input;

digital processor means for receiving and digitizing said input and output voltages, $V_{in}$ and $V_{out}$, a reference output voltage, $V_{ref}$, and current through said inductor, and for deriving a control loop signal from all of said voltages and from said current for driving said control input so that said output voltage is substantially equal or proportional to $V_{ref}$;

means for changing said switchmode power supply between a buck mode where said input voltage is greater than said output voltage to a boost mode where said input voltage is less than said output voltage, where said boost mode has a function of a ratio of said input and output voltages versus duty factor different from a similar function of said buck mode, including at least four transistor switches selectively driven by said control signal or the inverse of said control signal;

said digital processor means being responsive to the respective boost and buck mode functions to compensate said control loop signal in accordance with said boost or buck mode function.

\* \* \* \* \*